April 2, 1935. M. MOLESKI 1,996,624
HEDGE TRIMMER
Filed May 4, 1933
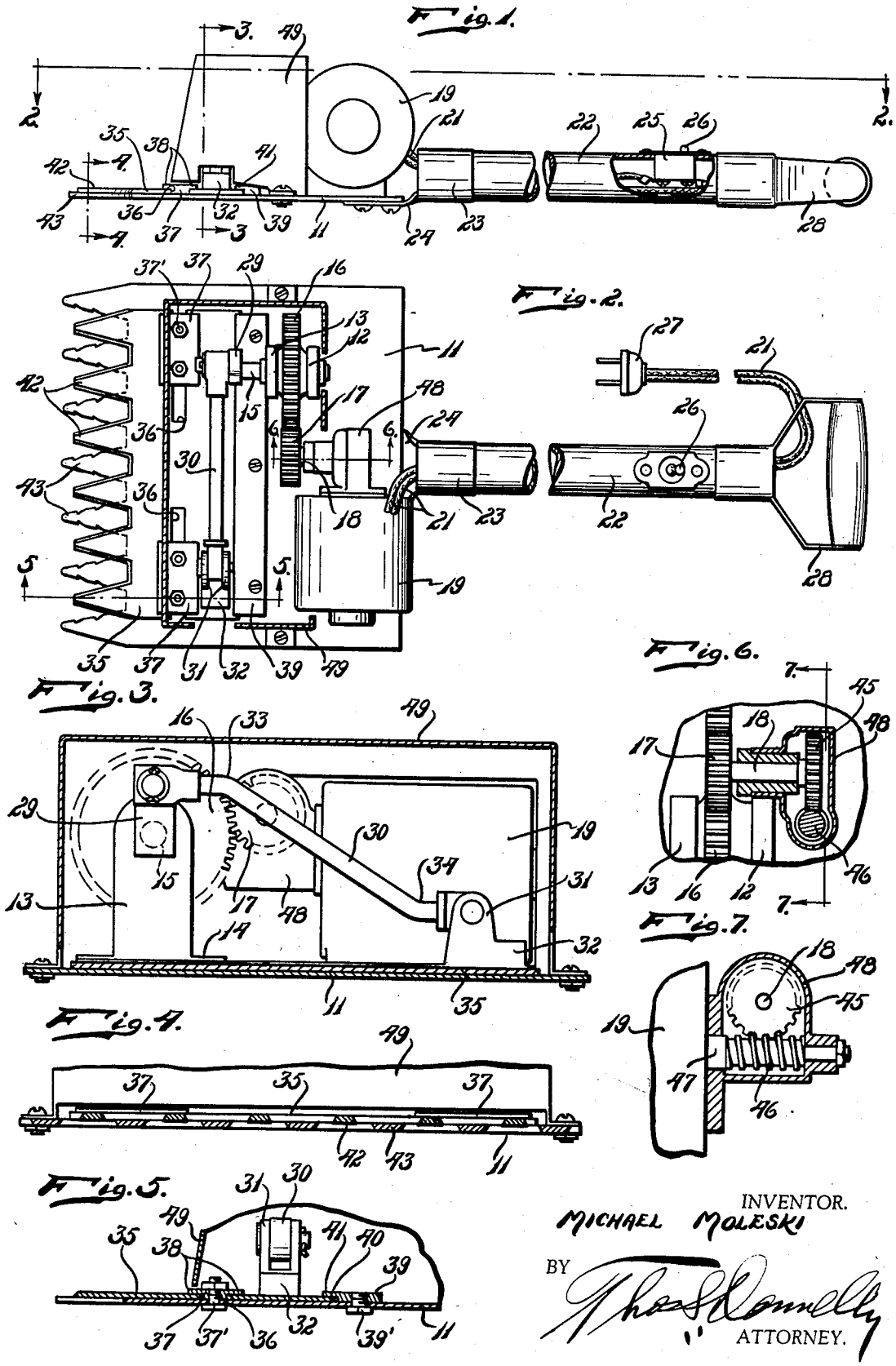
INVENTOR.
MICHAEL MOLESKI
BY
ATTORNEY.

Patented Apr. 2, 1935

1,996,624

UNITED STATES PATENT OFFICE 1,996,624

HEDGE TRIMMER

Michael Moleski, Detroit, Mich.

Application May 4, 1933, Serial No. 669,286

1 Claim. (Cl. 30—11)

My invention relates to a new and useful improvement in a hedge trimmer of the power driven type, and has for its object the provision of a device of this class which will be simple in structure, economical of manufacture, durable, easily and quickly assembled, light, and highly efficient in use.

Another object of the invention is the provision of a device of this class which will be compact and mounted on a single supporting plate which may be economically manufactured.

Another object of the invention is the provision of a device of this class in which a reciprocation of the cutter plate may be easily effected due to the substantial guiding and mounting of the plate.

Other objects will appear hereinafter.

The invention consists in the combination and arrangement of parts hereinafter described and claimed.

The invention will be best understood by a reference to the accompanying drawing which forms a part of this specification, and in which, Fig. 1 is a side elevational view with parts broken away.

Fig. 2 is a view taken on line 2—2 of Fig. 1 with a part broken away.

Fig. 3 is a view taken on line 3—3 of Fig. 1.

Fig. 4 is a fragmentary sectional view taken on line 4—4 of Fig. 1.

Fig. 5 is a fragmentary sectional view taken on line 5—5 of Fig. 2.

Fig. 6 is a fragmentary sectional view taken on line 6—6 of Fig. 2.

Fig. 7 is a fragmentary sectional view taken on line 7—7 of Fig. 6.

The invention comprises a supporting plate 11 on which are mounted the spaced standards 12 and 13 and projecting upwardly from a common base 14. Journaled in these standards and projected therethrough is a shaft 15 on which is fixedly mounted, between the standards, a gear 16 meshing with the gear 17 which is fixedly mounted on the shaft 18. This shaft 18 projects into the housing 48, and fixedly mounted on the shaft 18 within the housing 48 is a pinion 45 which is adapted to be driven by the worm 46 formed on the shaft 47 of the electric motor 19. The wires 21 which connect to the motor 19 are extended through the tubular handle 22 and through a switch 25 operated by the switch arm 26 to a socket plug 27. A fitting 23 connects to one end of the handle 22 and is provided with an integral tongue 24 projecting from one end thereof, this tongue 24 being suitably connected to the plate 11.

Formed on one end of the shaft 15 is a crank 29 which pivotally connects to the pitman arm or drive rod 30 on one end thereof. The opposite end of this drive arm 30 is pivotally connected between the lugs 31 and projects upwardly from the block 32 which is fixedly mounted on the slide plate 35. As shown in Fig. 3, the pitman or drive arm 30 is angularly turned at 33 to incline downwardly and again at 34 to extend horizontally. The plate 35 is provided at its opposite sides with elongated slots 36 in which engage the blocks 37 which are secured to the supporting plate 11 by the bolts 37'. These blocks 37 are provided with the outwardly projecting flanges 38 which overlie the slots 36 and engage the upper surface of the cutter plate 35. A retaining plate 39 is mounted by the screws 39' on the supporting plate 11. This retaining plate 39 is cut away at one edge as at 40 to provide the flange portion 41 which overlies the rear edge of the cutter plate 35 and engages the upper surface thereof. On the forward edge of the supporting plate 11 are formed the cutting teeth 43, cooperating with which are the cutting teeth 42 formed on the forward edge of the cutter plate 35. An inclosing housing 49 is mounted on the plate 11 to inclose the gearing and operating mechanism.

When the socket plug 27 is suitably connected to a suitable source of electrical energy and the switch 26 closed to start the motor 19, the rotation of the gear 17 will effect a rotation of the gear 16 which will cause a reciprocation of the arm 30 so as to effect a reciprocating sliding movement of the cutter plate 35. In this sliding movement, this cutter plate will be guided by the blocks 37 engaging in the slots 36 and by the flange 41. With a device of this kind the trimming of a hedge becomes an easy and simple matter and an accurate trimming of the same becomes possible. Due to the mounting of the cutter plate 35, a quiet and smooth operation is provided and a minimum possibility of a binding of the plate 35 is present. Moreover, by mounting the device on the supporting plate 11 which serves as one of the cutter plates, a compact and properly balanced structure is provided. It will be noted that the gears are mounted at one side of the plate 11 and the motor 19 adjacent the opposite side so that a tendency of the plate to tilt to either side is reduced to a minimum. This balancing of the plate 11 is due to the particular drive connections between the slidable cutter plate and the source of power.

While I have illustrated and described the preferred form of my invention, I do not wish to limit myself to the precise details of structure shown, but desire to avail myself of such variations and modifications as may come within the scope of the appended claim.

Having thus described my invention, what I claim as new and desire to secure by Letters Patent is:

A hedge trimmer of the class described, comprising: a supporting plate having cutting teeth formed on one edge; a handle secured to the opposite edge of said plate and projecting outwardly, centrally, therefrom and provided on its outer end with a hand-hold; a slidable plate mounted on said supporting plate and provided at one of its edges with teeth for cooperating with the teeth on said supporting plate; a motor mounted on said supporting plate at one side of the medial line thereof; a gear driven by said motor and extending on the opposite side of said medial line; a pair of spaced standards on said supporting plate at the opposite side of said medial line; a shaft rotatably mounted in said standards; a gear fixedly mounted on said shaft between said standards and in alignment with and meshing with said motor driven gear; a crank arm fixedly mounted on said shaft; a pair of lugs projecting upwardly from said slidable plate; and a drive rod pivotally connected at one end to the end of said crank arm and at its opposite end to said lugs, said rod having its ends angularly turned to extend angularly to the main body thereof and in parallel relation to each other.

MICHAEL MOLESKI.